United States Patent
Yang et al.

(10) Patent No.: US 11,176,684 B2
(45) Date of Patent: Nov. 16, 2021

(54) CUSTOMER BEHAVIOR ANALYZING METHOD AND CUSTOMER BEHAVIOR ANALYZING SYSTEM

(71) Applicant: Acer Incorporated, New Taipei (TW)

(72) Inventors: Tsung-Han Yang, New Taipei (TW); Eugene Yi-Cheng Shen, New Taipei (TW); Tsung-Yao Chen, New Taipei (TW); Andy Ho, New Taipei (TW); Szu-Chieh Wang, New Taipei (TW); Jian-Chi Lin, New Taipei (TW); Chian-Ying Li, New Taipei (TW)

(73) Assignee: Acer Incorporated, New Taipei (TW)

( * ) Notice: Subject to any disclaimer, the term of this patent is extended or adjusted under 35 U.S.C. 154(b) by 72 days.

(21) Appl. No.: 16/431,759

(22) Filed: Jun. 5, 2019

(65) Prior Publication Data
US 2020/0265586 A1    Aug. 20, 2020

(30) Foreign Application Priority Data
Feb. 18, 2019   (TW) ................. 108105306

(51) Int. Cl.
*G06T 7/00* (2017.01)
*G06T 7/246* (2017.01)
(Continued)

(52) U.S. Cl.
CPC .......... *G06T 7/246* (2017.01); *G06K 9/00778* (2013.01); *G06T 7/73* (2017.01);
(Continued)

(58) Field of Classification Search
CPC .. G06T 7/246; G06T 7/73; G06T 7/97; G06T 7/00; G06T 2207/30232; G06T 2207/30241; G06K 9/00778; G06K 9/00771; G06K 9/00671; G06K 9/6201; G06K 9/78; G06K 9/00335; G06K 9/00342; G06K 9/00355; G06K 9/00288;
(Continued)

(56) References Cited

U.S. PATENT DOCUMENTS 7,930,204 B1 *  4/2011  Sharma ............. G06Q 30/0203
                                                    705/7.32
8,219,438 B1 *  7/2012  Moon ................ G06Q 30/0201
                                                    705/7.29
(Continued)

FOREIGN PATENT DOCUMENTS

CN      105321090      2/2016
CN      105518734      4/2016
(Continued)

*Primary Examiner* — Jose L Couso
(74) *Attorney, Agent, or Firm* — JCIPRNET

(57) ABSTRACT

An embodiment of the disclosure provides a customer behavior analyzing method which includes: capturing an image of a target region by at least one camera; analyzing the image by an image recognition module to detect a customer behavior of at least one customer in the target region; and automatically generating customer behavior information according to the customer behavior. The customer behavior information reflects attention of the customer to at least one commodity. Another embodiment of the disclosure provides a customer behavior analyzing system.

18 Claims, 5 Drawing Sheets

(51) Int. Cl.
*G06K 9/00* (2006.01)
*G06T 7/73* (2017.01)

(52) U.S. Cl.
CPC ...... *G06T 7/97* (2017.01); *G06T 2207/30232* (2013.01); *G06T 2207/30241* (2013.01)

(58) Field of Classification Search
CPC .......... G06K 9/00362; G06K 9/00577; G06K 9/00624; G06K 9/46; G06K 2209/17; G06Q 30/0201; G06Q 30/06; G06Q 30/00; G06Q 30/02; G06Q 30/0601; G06Q 30/0269; G06Q 30/0609; G06Q 30/0623; G06Q 30/0639; G06Q 10/087; G06Q 10/0639; G06Q 20/20; G06Q 20/203; G06Q 50/10; G06Q 50/12; G07G 1/12; G07G 1/14; H04N 7/181; H04N 17/002; H04N 5/225; H04N 5/247
See application file for complete search history.

(56) References Cited

U.S. PATENT DOCUMENTS

| | | | | |
|---|---|---|---|---|
| 8,412,656 | B1* | 4/2013 | Baboo | G06Q 30/0282 706/20 |
| 8,570,376 | B1* | 10/2013 | Sharma | G06K 9/00771 348/159 |
| 9,740,977 | B1* | 8/2017 | Moon | G06K 9/00771 |
| 10,217,120 | B1* | 2/2019 | Shin | G06Q 10/06393 |
| 10,282,720 | B1* | 5/2019 | Buibas | G06K 9/00201 |
| 10,282,852 | B1* | 5/2019 | Buibas | G06T 7/277 |
| 10,354,262 | B1* | 7/2019 | Hershey | H04L 67/306 |
| 10,373,322 | B1* | 8/2019 | Buibas | G06K 9/00201 |
| 10,535,146 | B1* | 1/2020 | Buibas | G06Q 10/087 |
| 10,573,134 | B1* | 2/2020 | Zalewski | G06Q 20/12 |
| 10,713,670 | B1* | 7/2020 | Moon | G06Q 30/0201 |
| 2009/0063307 | A1* | 3/2009 | Groenovelt | G06Q 10/087 705/28 |
| 2010/0049624 | A1* | 2/2010 | Ito | G06Q 30/00 705/26.1 |
| 2014/0222501 | A1 | 8/2014 | Hirakawa et al. | |
| 2014/0358639 | A1* | 12/2014 | Takemoto | G06K 9/00335 705/7.33 |
| 2015/0010204 | A1* | 1/2015 | Iwai | G06K 9/00771 382/103 |
| 2015/0199698 | A1* | 7/2015 | Yoshitake | G06K 9/00335 705/7.34 |
| 2015/0363798 | A1* | 12/2015 | Aihara | G06Q 30/0201 705/7.29 |
| 2016/0110791 | A1* | 4/2016 | Herring | G01G 19/4144 705/26.61 |
| 2016/0203499 | A1* | 7/2016 | Yamashita | G06Q 30/0201 705/7.29 |
| 2017/0262725 | A1* | 9/2017 | Houri | G06K 9/00771 |
| 2017/0300938 | A1* | 10/2017 | Sakata | G06Q 50/10 |
| 2018/0293598 | A1 | 10/2018 | Sato | |
| 2019/0180465 | A1* | 6/2019 | Ikeda | G06T 7/70 |
| 2019/0279229 | A1* | 9/2019 | Warita | G06Q 30/02 |

FOREIGN PATENT DOCUMENTS

| | | |
|---|---|---|
| CN | 108898109 | 11/2018 |
| TW | I578272 | 4/2017 |

* cited by examiner

CUSTOMER BEHAVIOR ANALYZING METHOD AND CUSTOMER BEHAVIOR ANALYZING SYSTEM

CROSS-REFERENCE TO RELATED APPLICATION

This application claims the priority benefit of Taiwan application serial no. 108105306, filed on Feb. 18, 2019. The entirety of the above-mentioned patent application is hereby incorporated by reference herein and made a part of this specification.

BACKGROUND

1. Technical Field

The disclosure relates to a smart store management technology, and particularly relates to a customer behavior analyzing method and a customer behavior analyzing system.

2. Description of Related Art

Compared to online stores able to easily collect the browsing records of the customers, it is not as easy for managers of physical stores to know the real thoughts of the customers. For example, for some physical stores, while there are many people coming to these stores, only few of them actually make a purchase. Alternatively, for some physical stores, while there are not many people coming to these stores, a majority of them do make a purchase. There are many reasons that may contribute to such a difference. It may be that the commodities themselves are not appealing or the commodities are overpriced, etc. However, the reason actually causing the difference cannot be defined simply based on the number of people purchasing the commodities or the sale amount, and therefore the sales strategy cannot be adjusted to address the issue.

SUMMARY

Embodiments of the disclosure provide a customer behavior analyzing method and a customer behavior analyzing system capable of analyzing a customer behavior by using an image analyzing technology for a business owner to adjust a business strategy.

An embodiment of the disclosure provides a customer behavior analyzing method which includes: capturing an image of a target region by at least one camera; analyzing the image by an image recognition module to detect a customer behavior of at least one customer in the target region; and automatically generating customer behavior information according to the customer behavior. The customer behavior information reflects attention of the customer to at least one commodity.

Another embodiment of the disclosure provides a customer behavior analyzing system including at least one camera and a processor. The camera is configured to capture an image of a target region. The processor is coupled to the camera. The processor is configured to analyze the image through an image recognition module to detect a customer behavior of at least one customer in the target region. The processor is further configured to automatically generate customer behavior information according to the customer behavior. The customer behavior information reflects attention of the customer to at least one commodity.

Based on the above, after the image of the target region is obtained, the image may be analyzed by the image recognition module to detect the customer behavior of the customer in the target region. According to the customer behavior, the customer behavior information reflecting the attention of the customer to at least one commodity may be generated automatically. In this way, the business owner may modify their business strategy according to the customer behavior information, thereby addressing issues which physical stores are unable to find easily.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
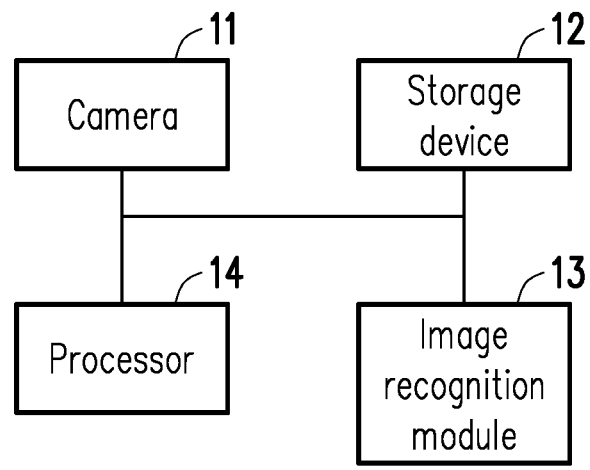
FIG. 1 is a functional block diagram illustrating a customer behavior analyzing system according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a functional block diagram illustrating a customer behavior analyzing system according to an embodiment of the disclosure. Referring to FIG. 1, a system 10 (also referred to as a customer behavior analyzing system) includes a camera 11, a storage device 12, an image recognition module 13, and a processor 14. The camera 11 is configured to capture images. For example, the camera 11 may generally refer to an image capturing device (or a photographing device) including one or more lenses and one or more photosensitive elements. There may be one or more cameras 11. In an embodiment, if there are multiple cameras 11, the shooting angles (or shooting directions) of the cameras 11 may be respectively different from one another, and the image regions captured by the cameras 11 may be non-overlapped with each other or may be at least partially overlapped with each other.

The storage device 12 is configured to store data. For example, the storage device 12 may include a volatile storage medium and a non-volatile storage medium. The volatile storage medium may include a random access memory (RAM). The non-volatile memory module may include a flash memory module, a read only memory (ROM), a solid state drive (SSD), and/or a conventional hard disk drive (HDD), etc. Furthermore, there may be one or more storage devices 12.

The image recognition module 13 is configured to perform image recognition on the images captured by the camera 11. For example, the image recognition module 13 may perform image recognition based on a convolutional neural network (CNN) architecture or other types of image recognition architectures (or algorithms). The image recognition module 13 may be implemented as software or hardware. In an embodiment, the image recognition module 13 includes a software module. For example, the program codes of the image recognition module 13 may be stored in the storage device 12 and executed by the processor 14. In an embodiment, the image recognition module 13 includes a hardware circuit. For example, the image recognition module 13 may include a graphics processing unit (GPU) or other programmable general purpose or special purpose microprocessors, digital signal processors, programmable controllers, application specific integrated circuits, programmable logic devices, other similar devices or a combination thereof. Besides, there may be one or more image recognition module 13.

The processor 14 is coupled to the camera 11, the storage device 12, and the image recognition module 13. The processor 14 is configured to control the camera 11, the storage device 12, and the image recognition module 13. For example, the processor 14 may include a central processing unit (CPU), a GPU, or other programmable general purpose or special purpose microprocessors, digital signal processors, programmable controllers, application specific integrated circuits, programmable logic devices, other similar devices or a combination thereof. In an embodiment, the processor 14 may control the entire or a part of the operation of the system 10. In an embodiment, the image recognition module 13 may be implemented in the processor 14 as software, firmware or hardware. Furthermore, there may be one or more processors 14.

In this embodiment, the camera 11 is configured to capture images of a certain region (also referred to as a target region). For example, the shooting angle of the camera 11 may cover the target region. The target region may include a region inside a certain store (also referred to as an in-store region) and/or a region outside the store (also referred to as an out-of-store region). The processor 14 may analyze the images captured by the camera 11 through the image recognition module 13, so as to detect customer behavior of at least one customer in the target region. For example, in an embodiment, the customer behavior may include at least one of a movement path of a customer in the target region, a stay position of a customer in the target region, a stay time of a customer at a certain stay position, a hand movement of a customer, and an eye view angle of the customer. Alternatively, in an embodiment, the customer behavior may include at least one of a behavior that a customer takes a look at certain commodity, a behavior that a customer picks up at least one commodity, and a behavior that a customer drops at least one commodity.

The processor 14 may automatically generate customer behavior information according to the customer behavior. The customer behavior information may reflect the attention of the customer(s) to at least one commodity. For example, the attention of the customer to a certain commodity is correlated (e.g., positively correlated) to the interest of the customer in the commodity. For example, if a certain customer is interested in a certain commodity (but has not purchased the commodity yet), the customer may directly walk to the goods shelf on which the commodity is displayed from the store entrance, stay in front of the goods shelf for a long time, pick up the commodity from the goods shelf, and/or the eye balls of the customer may continuously focus on the commodity, etc. These behaviors reflect that the customer has a higher interest in and/or pays more attention to a certain commodity. Comparatively, if a certain customer is not interested in a certain commodity, the customer may quickly skim through the goods shelf on which the commodity is displayed, not pick up any commodity from the goods shelf, and/or the eye balls of the customer does not continuously focus on the commodity, etc. These behaviors reflect that the customer has a lower interest in and/or has little attention to a certain commodity. The processor 14 may automatically obtain the attention (also referred to as attention degree) of customer(s) in the target region to a specific commodity according to the customer behavior analyzed by the image recognition module 13 and generate corresponding customer behavior information.

In an embodiment, the customer behavior information includes at least one of the information of the number of people outside the store, the information of the number of people inside the store, the information of the number of times of a commodity receiving attention, the information of the number of times of a commodity being picked up, the information of the number of checkouts, and the information of the number of times of return of a customer. The information of the number of people outside the store may reflect the statistical information of the number of people located in the out-of-store region within a certain period of time. The information of the number of people inside the store may reflect the statistical information of the number of people located in the in-store region within a certain period of time. The information of the number of times of a commodity receiving attention may reflect the statistical information of the number of times that a customer takes a look at (or checks) a certain commodity (or a certain type of commodities) within a certain time period. The information of the number of times of a commodity being picked up may reflect the statistical information of the number of times that a certain commodity (or a certain type of commodities) is picked up from the goods shelf by customer(s) within a certain time period. The information of the number of checkouts may reflect the statistical information of the number of times that a certain commodity (or a certain type of commodities) is picked up and checked out at the checkout area within a certain time period. The information of times of return of a customer may reflect the statistical information that a certain customer (having specific identity information) enters the in-store region within a certain period of time.

In an embodiment, the target region includes the in-store region and the out-of-store region, and the customer behavior information may reflect an entrance ratio of customer(s). For example, the processor 14 may divide the (averaged) number of people inside the store within a certain time period by the total of the (averaged) number of people outside the store and the (averaged) number of people inside the store within the time period, so as to obtain the entrance ratio. Besides, a wider variety of types of customer behavior information may also be obtained according to the above types of statistical information. The business owner may modify their operating/business strategy according to the customer behavior information, thereby addressing an issue which physical stores do not easily find conventionally, such as a decreasing of purchasing ratio. For example, if the customer behavior information reflects that most customers are interested in a certain commodity in the store, but only few customers actually purchase the commodity, the business owner may adjust their operating strategy according to the customer behavior information, such as lowering the price of the commodity, offering a related discount, or adjusting the position of the goods shelf carrying the commodity, thereby making it possible to effectively increasing the ratio at which customers purchase the commodity. In an embodiment, the processor 14 may provide related operating suggestions and/or operating strategies (e.g., lowering the price of the commodity, offering a related special discount, or adjusting the position of goods shelf, etc.), so as to help the business owner to address the issue.

Figure 2:
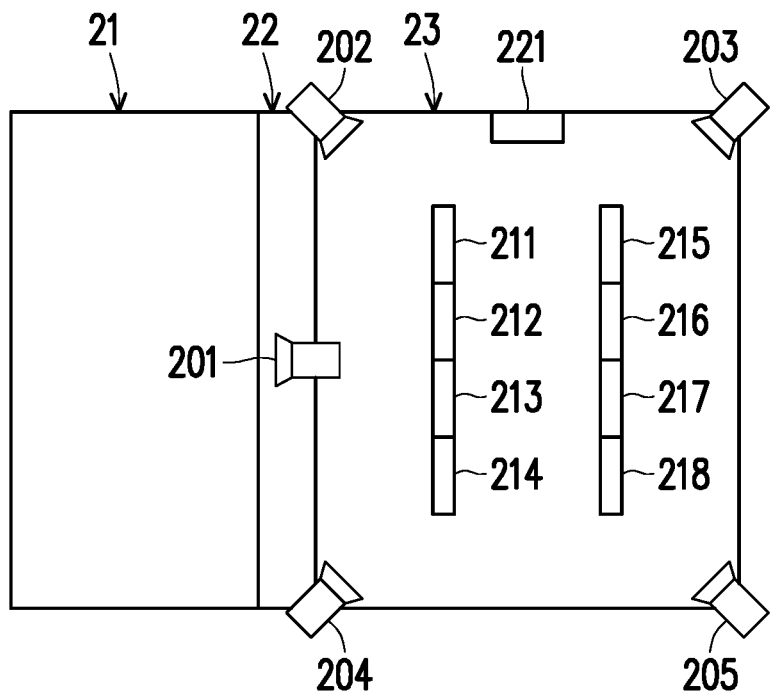
FIG. 2 is a schematic view illustrating a target region and a distribution of cameras according to an embodiment of the disclosure.

FIG. 2 is a schematic view illustrating a target region and a distribution of cameras according to an embodiment of the disclosure. Referring to FIG. 2, in this embodiment, the target region includes an out-of-store region 21, a buffer region 22, and an in-store region 23. The buffer region 22 may be configured between the out-of-store region 21 and the in-store region 23. Alternatively, in an embodiment, the buffer region 22 may be omitted.

In this embodiment, cameras 201 to 205 may be separately set at higher positions (e.g., the ceiling of the store) to capture images in the target region. For example, the camera 21 may face toward the out-of-store region 21 to capture the image of the out-of-store region 21 (and at least a portion of the buffer region 22). The cameras 202 to 205 may face toward the in-store region 23 (and at least a portion of the buffer region 22) to jointly capture the images of the in-store region 23. In an embodiment, the images captured by the cameras 201 to 205 are also referred to as environment images.

In this embodiment, goods shelves 211 to 218 and a checkout counter 221 are disposed in the in-store region 23. Various types of commodities may be displayed on the goods shelves 211 to 218. After picking up a commodity from at least one of the goods shelves 211 to 218, the customer may take the commodity to the checkout counter 221 to check out the commodity. In an embodiment, checkout information at the checkout counter 221 may be recorded. The processor 14 may generate the customer behavior information (e.g., the number of checkouts) according to the checkout information.

It is noted that, in another embodiment of FIG. 2, the number of regions divided in the target region, the distribution of the regions divided in the target region, the number of the cameras 201 to 205, the distribution of the cameras 201 to 205, the shooting angles of the cameras 201 to 205, the distribution of the goods shelves 211 to 218, and the position of the checkout counter 221 can all be adjusted. The disclosure does not intend to impose a limitation on this regard.

In an embodiment, through analyzing a plurality of images taken successively by the image recognition module 13, the processor 14 may obtain overlapped information of contours of a certain customer (also referred to as a target customer) between the images. The processor 14 may identify the target customer according to the overlapped information. For example, the identified customer may be assigned unique identity information. In an example of analyzing two images taken successively (also referred to as a first image and a second image), the overlapped information may reflect the overlapped range and/or overlapped area of the contours of the target customer in/between the two images. The processor 14 may identify the same target customer in a plurality of successive images according to the overlapped information.

Figure 3:
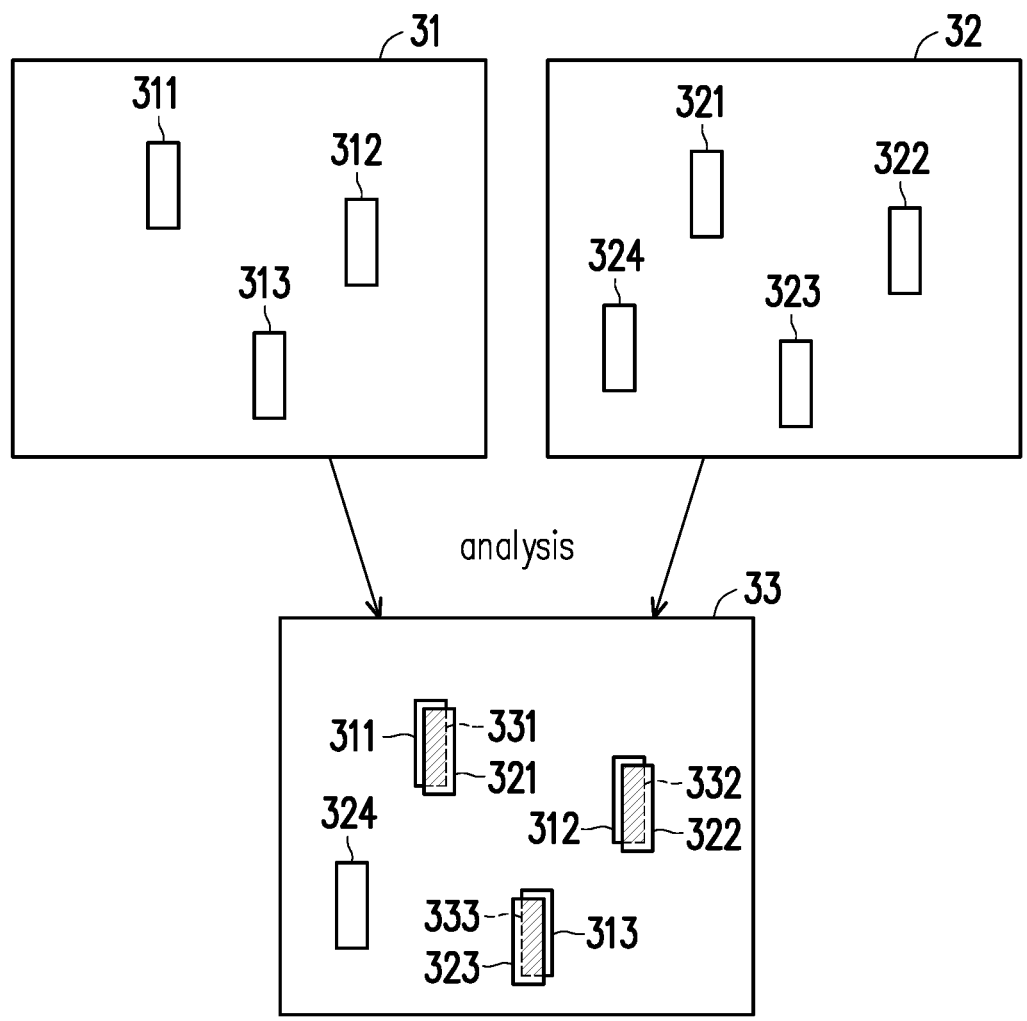
FIG. 3 is a schematic view illustrating analyzing a plurality of images for identifying a target customer according to an embodiment of the disclosure.

FIG. 3 is a schematic view illustrating analyzing a plurality of images for identifying a target customer according to an embodiment of the disclosure. Referring to FIGS. 1, 2, and 3, it is assumed that the camera 201 successively captures images 31 and 32. Three people are identified in the image 31 and are respectively represented by predictive frames 311 to 313. Four people are identified in the image 32 and are respectively represented by predictive frames 321 to 324. After analyzing the images 31 and 32, the overlapped information of the predictive frames can be obtained. For example, assuming that an image 33 represents the overlapped images 31 and 32, the predictive frames 311 and 321 are overlapped with each other, and an overlapped region 331 may be obtained. The predictive frames 312 and 322 are overlapped with each other, and an overlapped region 332 may be obtained. The predictive frames 313 and 323 are overlapped with each other, and an overlapped region 333 may be obtained. Meanwhile, the predictive frame 324 is not overlapped with any predictive frame in the image 31.

The processor 14 may determine the identity of the person corresponding to each predictive frame in the images 31 and 32 according to the overlapped regions 331 to 333. For example, the processor 14 may determine whether the predictive frames 311 and 321 correspond to the same person according to the ratio of the area of the overlapped region 331 to the area of the union of the predictive frames 311 and 321. Alternatively, the processor 14 may determine whether the predictive frames 311 and 321 correspond to the same person according to whether the area of the overlapped region 331 is greater than a preset value. In addition, other algorithms may also be adopted to determine the identity of the person corresponding to each predictive frame in the images 31 and 32. The disclosure does not intend to a limitation on this regard.

The processor 14 may assign identity information (e.g., an ID number) to each identified person in the images. For example, the person corresponding to the predictive frames 311 and 321 may be designated as Customer A, the person corresponding to the predictive frames 312 and 322 may be designated as Customer B, the person corresponding to the predictive frames 313 and 323 may be designated as Customer C, and the person corresponding to the predictive frame 324 may be designated as Customer D. Based on the customer behavior of a customer corresponding to certain identity information, the processor 14 may generate the customer behavior information corresponding to the identity information. For example, the customer behavior information related to Customer A may reflect the customer behavior of Customer A and/or the attention of Customer A to certain commodities.

In an embodiment, the processor 14 may identify the appearance information, such as age, gender, and/or body type, of a customer corresponding to certain identity information. The appearance information may also be analyzed to generate the customer behavior information corresponding to the customer. In this way, the customer behavior information may also reflect the attention of a customer of a specific age, gender, and/or body type to a specific commodity, etc.

In an embodiment of FIG. 2, one or more cameras may also be disposed on the goods shelves 211 to 218, so as to capture images of a customer (also referred to as customer images) in front of the goods shelves 211 to 218. The processor 14 may also analyze the customer images through the image recognition module 13 to obtain the customer behavior of the customer in the customer images. For example, the processor 14 may evaluate the behavior that the customer picks up a specific commodity and/or the customer drops a specific commodity according to the hand movement of the customer in the customer images. Besides, the processor 14 may evaluate the behavior that the customer takes a look at a specific commodity according to the eye view angle of the customer.

Figure 4A:
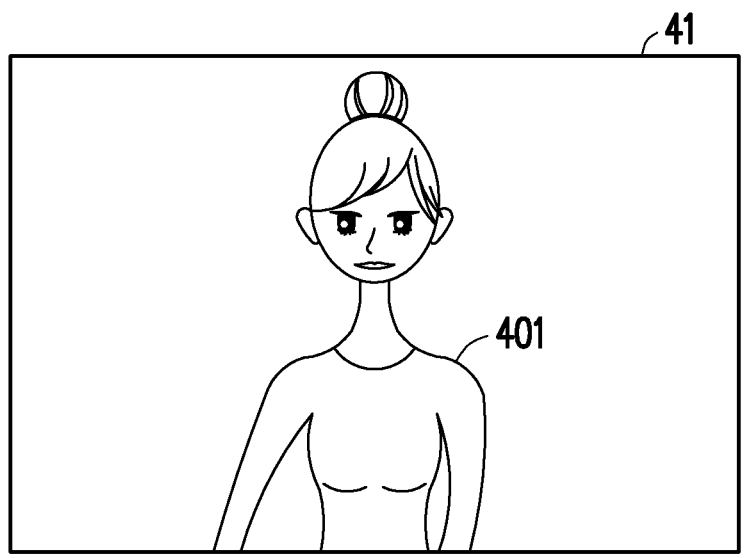
FIG. 4A and FIG. 4B are schematic views illustrating analyzing a customer image according to an embodiment of the disclosure.
Figure 4B:
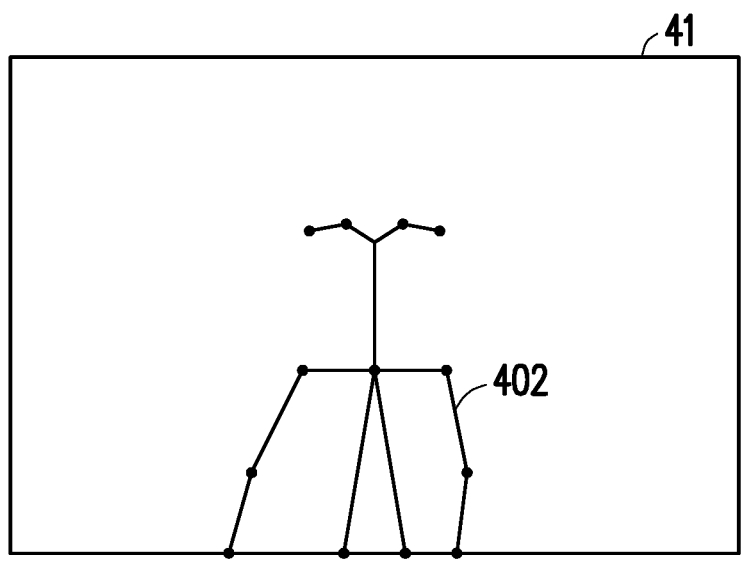

FIG. 4A and FIG. 4B are schematic views illustrating analyzing a customer image according to an embodiment of the disclosure. Referring to FIGS. 2, 4A, and 4B, it is assumed that a certain camera captures an image 41 (i.e., the customer image) in front of the goods shelf 211. The image 41 includes a contour of a customer 401. In an embodiment, the hand movement in the contour of the customer 401 may be analyzed to obtain the information of the specific commodity being picked up by the customer 401 on the goods shelf 211. In an embodiment, the eye ball position and/or the face orientation in the contour of the customer 401 may be analyzed to obtain the information of the specific commodity to which the customer 401 is paying attention on the goods shelf 211. Besides, in an embodiment, skeleton information 402 corresponding to the contour of the customer 401 may be obtained. The information of the specific commodity on the goods shelf 211 that the customer 401 is currently picking up may also be obtained according to the skeleton information 402.

Figure 5A:
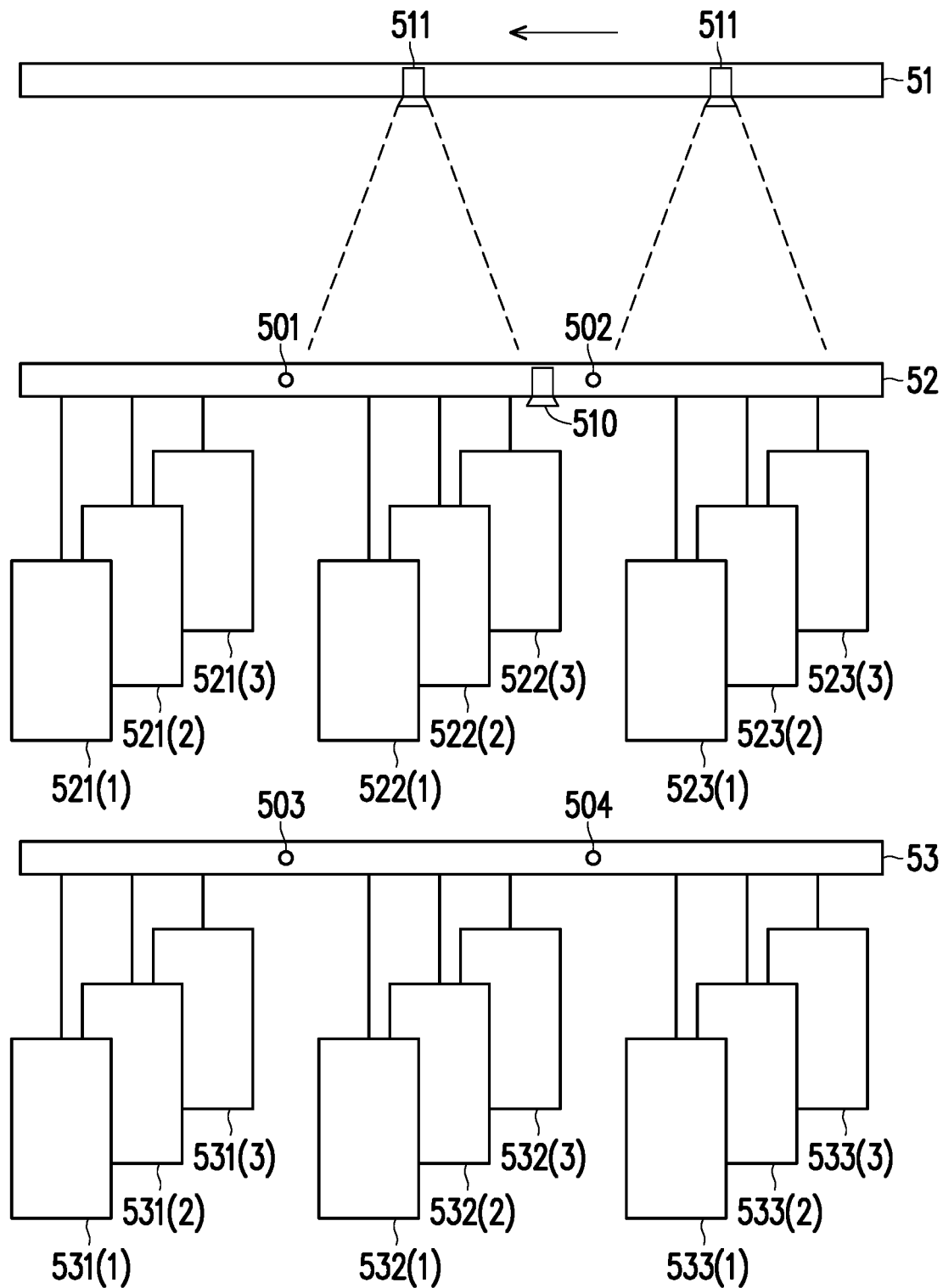
FIG. 5A is a schematic view illustrating a goods shelf according to an embodiment of the disclosure.

FIG. 5A is a schematic view illustrating a goods shelf according to an embodiment of the disclosure. Referring to FIG. 5A, it is assumed that a three-layer goods shelf includes commodity shelves 51 to 53. The commodity shelf 51 is located above the commodity shelf 52, and the commodity shelf 52 is located above the commodity shelf 53. Cameras 501 to 503 are disposed on the three-layer goods shelf to capture images of customers in front of the three-layer goods shelf. For example, the cameras 501 and 502 may be disposed on the commodity shelf 52, and the cameras 503 to 504 may be disposed on the commodity shelf 53. When a customer comes to the front of the three-layer goods shelf to take a look of a commodity or pick up a commodity, at least one of the cameras 501 to 504 may capture the customer image of the customer. Then, the contour similar to the contour shown in FIG. 4A and/or the skeleton information similar to the skeleton information shown in FIG. 4B may be analyzed to obtain the related customer behavior.

In the embodiment, it is assumed that commodities 521(1) to 521(3), 522(1) to 522(3), and 523(1) to 523(3) are displayed below the commodity shelf 52, and commodities 531(1) to 531(3), 532(1) to 532(3), and 533(1) to 533(3) are displayed below the commodity shelf 53. By analyzing the captured customer image, a commodity at a specific position being picked up by the customer may be roughly determined. Taking FIG. 4A (or FIG. 4B) as an example, the hand movement of the customer 401 may indicate that the customer 401 is picking up one of the commodities 522(1) to 522(3). The processor 14 may determine that one of the commodities 522(1) to 522(3) has been picked up by the customer 401 according to the position of the camera capturing the customer image and the position at which the relevant commodities are placed. As the hand movement and/or the eye view angle of the customer 401 changes, the commodity at a different position may also be determined as being picked up and/or as being paid attention to by the customer 401.

In this embodiment, the three-layer goods shelf is further provided with cameras 510 and 511. For example, the camera 511 is disposed at the commodity shelf 51, and the camera 510 is disposed at the commodity shelf 52. Taking the camera 511 as an example, the camera 511 is configured to capture the images of the commodities 521(1) to 521(3), 522(1) to 522(3), and 523(1) to 523(3) (also referred to as commodity images) below the commodity shelf 52. The processor 14 may determine whether there is any shortage of quantities of the commodities below the commodity shelf 52 and/or whether there is any misplaced commodity below the commodity shelf 52 by analyzing the commodity images through the image recognition module 13. If it is determined that there is a shortage of quantities of the commodities below the commodity shelf 52, the processor 14 may generate a reminding message. For example, a message indicating that the quantities of the commodities below the commodity shelf 52 are insufficient may be output via an input/output interface (e.g., a screen), so as to remind the staff to replenish the commodities. Alternatively, if it is determined that a misplaced commodity is present below the commodity shelf 52, a message indicating that a misplaced commodity is present below the commodity shelf 52 may be output via the input/output interface (e.g., screen), so as to remind the staff to move the misplaced commodity to the correct display position. Besides, the commodity image captured by the camera 511 may also be used to identify whether belongings of the customer is left below the commodity shelf 52. If it is detected that belongings of the customer is left below the commodity shelf 52, a corresponding reminding message may also be output to remind the staff to return the customer's belongings to the customer as soon as possible. Besides, the camera 510 may be configured to capture the images of the commodities 531(1) to 531(3), 532(1) to 532(3), and 533(1) to 533(3) below the commodity shelf 53. Details concerning the operation will not be repeated in the following. It is noted that, in an embodiment, the image of the commodities 521(1) to 521(3), 522(1) to 522(3), and 523(1) to 523(3) below the commodity shelf 52 may also be captured by the camera 510, depending on the structure of the commodity shelf and the position at which the camera is placed.

In this embodiment, the camera 511 may be moved on the three-layer goods shelf through a track mechanism, as shown in FIG. 5A. For example, according to the customer image captured by at least one of the cameras 501 to 504, the processor 14 may preliminarily determine the current position of a customer and a commodity that the customer is possibly paying attention to and/or picking up. According to these information, the processor 14 may control the camera 511 to move to a specific position, so as to capture commodity images corresponding to the specific position in a real-time manner. For example, if the processor 14 determines that a customer is picking up one of the commodities 523(1) to 523(3), the processor 14 may instruct the camera 511 to move to a shooting position able to shoot the commodities 523(1) to 523(3). Then, if the processor 14 determines that the customer is picking up one of the commodities 522(1) to 522(3) instead, the processor 14 may instruct the camera 511 to move to a shooting position able to shoot the commodities 522(1) to 522(3).

Figure 5B:
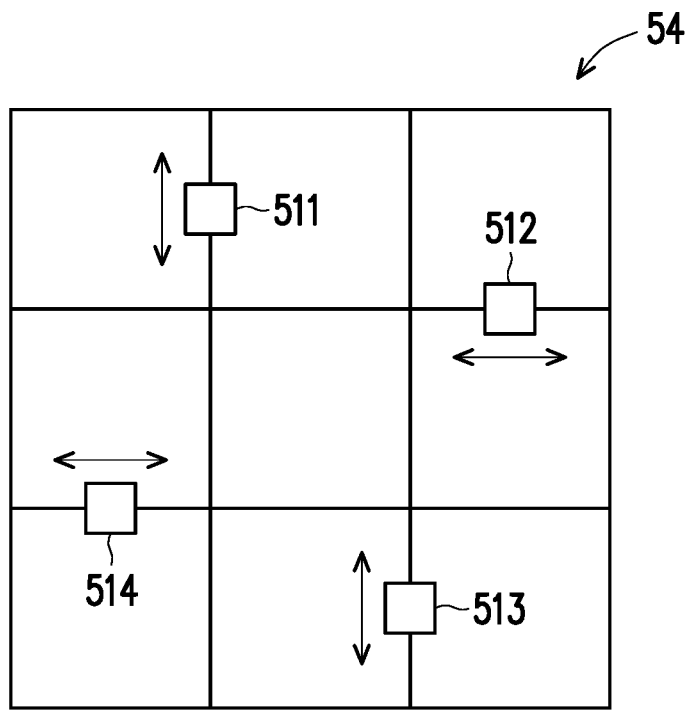
FIG. 5B is a schematic view illustrating a track mechanism according to an embodiment of the disclosure.

FIG. 5B is a schematic view illustrating a track mechanism according to an embodiment of the disclosure. Referring to FIG. 5B, a track mechanism 54 may have a grid structure. The cameras 511 to 514 may move on the track mechanism 54 to capture commodity images at different positions. For example, in an embodiment, the cameras 511 to 514 and the track mechanism 54 are all disposed at the commodity shelf 51 of FIG. 5A, and the track mechanism 54 is parallel to the commodity shelf 51. As the shooting position changes, at least one of the cameras 511 to 514 may be configured to capture the commodity images at different positions below the commodity shelf 52.

It is noted that the embodiments of FIGS. 5A and 5B merely serve as schematic illustrations and shall not be construed as limitations on the disclosure. For example, in another embodiment, there may be a greater or fewer number of cameras disposed on the goods shelf, the positions at which the cameras are disposed on the goods shelf may be modified, the cameras may be fixed to and not movable on the goods shelf, and/or the track mechanism for moving the cameras may not be the grid-like (e.g., being one-dimensional) according to practical needs.

In the above embodiments, a camera configured to shoot the environment images is also referred to as a first camera, a camera configured to shoot the customer images in front of the goods shelf is also referred to as a second camera, and a camera configured to shoot the commodity images on the goods shelf is also referred to as a third camera. The disclosure does not intend to limit the numbers and types of the cameras. For example, the cameras may include fisheye cameras, gun cameras, and hidden cameras, etc. The disclosure does not intend to impose a limitation on this regard.

In an embodiment, the processor 14 may automatically detect a staff in a captured image (e.g., the environment image and/or the customer image) through a feature model of the image recognition module 13. For example, the feature model may store the feature of the appearance (e.g., facial feature and/or apparel feature) of the staff. In the operation of obtaining the customer behavior, the processor 14 may instruct the image recognition module 13 to ignore the behavior of the staff in the images, so as to prevent the behavior of the staff (e.g., the movement path, stay position, action of picking up a commodity, and/or action of taking a look at the commodity of the staff) from affecting the results of the analysis on the customer behavior.

In an embodiment, the processor 14 may automatically detect a member in a captured image (e.g., the environment image and/or the customer image) through a feature model of the image recognition module 13. The member refers to a registered customer. For example, the feature model may store the feature of the appearance (e.g., facial feature and/or apparel feature) of the member. In the operation of obtaining the customer behavior, the processor 14 may further update the customer behavior information corresponding to a specific member, such as updating the preferred commodity type and/or preferred price, etc., of the member. The customer behavior information corresponding to the member may also help the business owner learn the preference and needs of most members, thereby adjusting the types and/or prices of the commodities for sale. Alternatively, the processor 14 may also provide relevant commodity information, advertisement information, and/or event information to the cell phone of the member or through e-mail, so as to notify the member of relevant information in a real-time manner, thereby facilitating the return rate.

Figure 6:
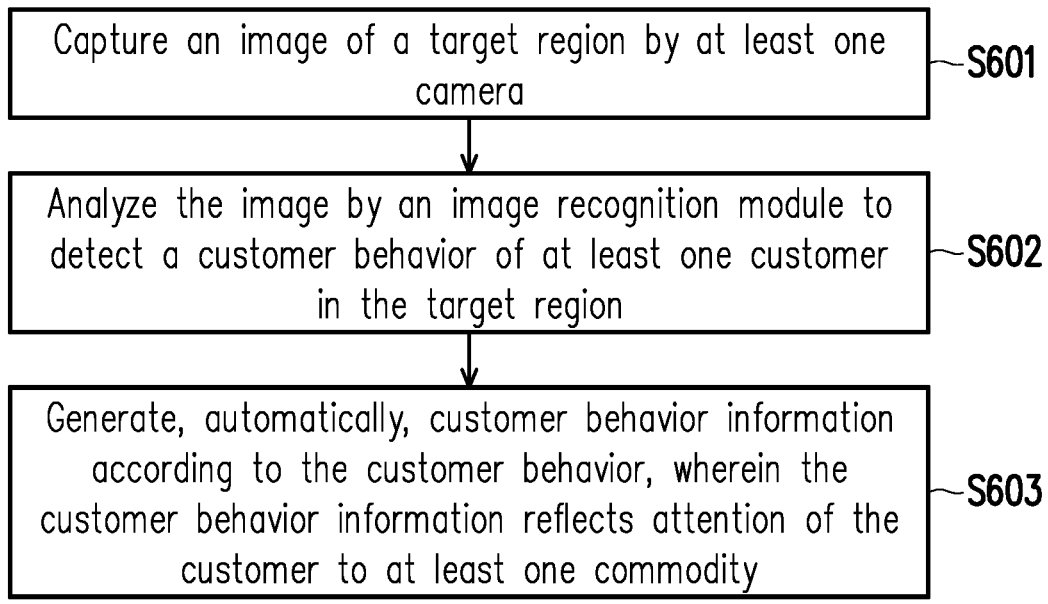
FIG. 6 is a schematic flowchart illustrating a customer behavior analyzing method according to an embodiment of the disclosure.

FIG. 6 is a schematic flowchart illustrating a customer behavior analyzing method according to an embodiment of the disclosure. Referring to FIG. 6, at step S601, an image of a target region is captured by at least one camera. At step S602, the image is analyzed by an image recognition module to detect a customer behavior of at least one customer in the target region. At step S603, customer behavior information is automatically generated according to the customer behavior. The customer behavior information may reflect the attention of the customer to at least one commodity.

However, the respective steps of FIG. 6 have been described in detail in the foregoing, so the details thereof will not be repeated in the following. It is noted that the respective steps in FIG. 6 may be implemented as a plurality of program codes or circuits. The disclosure does not intend to impose a limitation on this regard. Besides, the method of FIG. 6 may be used together with the above embodiments or used alone. The disclosure does not intend to impose a limitation on this regard.

In view of the foregoing, in the embodiments of the disclosure, after the images of the target region is obtained, the images may be analyzed by the image recognition module to detect the customer behavior of the customers in the target region. According to the customer behavior, the customer behavior information reflecting the attention of the customers to at least one commodity may be generated automatically. Besides, by simultaneously analyzing the environment images in the target region, the customer images in front of the goods shelf, and the commodity images on the goods shelf, the attention of the customers to different types of commodities can be assessed precisely to provide the business owner with the customer behavior information in addition to checkout information. In this way, the business owner may modify their operating/business strategy according to the customer behavior information, thereby addressing issues which physical stores are unable to find easily.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A customer behavior analyzing method, comprising:
capturing an image of a target region by at least one camera;
analyzing the image by an image recognition module to detect a customer behavior of at least one customer in the target region;
generating, automatically, customer behavior information according to the customer behavior, wherein the customer behavior information reflects attention of the at least one customer to at least one commodity;
obtaining a current position of a specific customer among the at least one customer based on the image; and
controlling a specific camera among the at least one camera to physically move, by a track mechanism on a shelf, from a first location to a second location on the shelf to capture a commodity image of a commodity to which the specific customer is paying attention.

2. The customer behavior analyzing method as claimed in claim 1, wherein the customer behavior comprises at least one of a movement path of the at least one customer in the target region, a stay position of the at least one customer in the target region, a stay time of the at least one customer at the stay position, a hand movement of the at least one customer, and an eye view angle of the at least one customer.

3. The customer behavior analyzing method as claimed in claim 1, wherein the customer behavior comprises at least one of a behavior that the at least one customer takes a look at the least one commodity, a behavior that the at least one customer picks up the at least one commodity, and a behavior that the at least one customer drops the at least one commodity.

4. The customer behavior analyzing method as claimed in claim 1, wherein the customer behavior information comprises at least one of information of a number of people outside a store, information of a number of people inside the store, information of a number of times of a commodity receiving attention, information of a number of times of a commodity being picked up, information of a number of checkouts, and information of a number of times of return of a customer.

5. The customer behavior analyzing method as claimed in claim 1, wherein the target region comprises an in-store region and an out-of-store region, and the customer behavior information further reflects an entrance ratio of the at least one customer.

6. The customer behavior analyzing method as claimed in claim 1, wherein a step of analyzing the image by the image recognition module to obtain the customer behavior of the at least one customer in the target region comprises:
   analyzing a first image and a second image to obtain overlapped information of a contour of a target customer among the at least one customer between the first image and the second image; and
   identifying the target customer according to the overlapped information.

7. The customer behavior analyzing method as claimed in claim 1, wherein a step of analyzing the image by the image recognition module to obtain the customer behavior of the at least one customer in the target region comprises:
   detecting, automatically, a staff in the image through a feature model; and
   ignoring a behavior of the staff in an operation of obtaining the customer behavior of the at least one customer.

8. The customer behavior analyzing method as claimed in claim 1, wherein the at least one camera comprises a first camera, a second camera, and a third camera, the first camera is configured to capture an environment image in the target region, the second camera is configured to capture a customer image in front of a goods shelf in the target region, and the third camera is configured to capture a commodity image of the goods shelf.

9. The customer behavior analyzing method as claimed in claim 8, further comprising:
   analyzing the commodity image by the image recognition module to generate a reminding message which comprises at least one of a message indicating that a quantity of a commodity on the goods shelf is insufficient and a message indicating that a misplaced commodity is present on the goods shelf.

10. A customer behavior analyzing system, comprising:
   at least one camera, configured to capture an image of a target region; and
   a processor, coupled to the at least one camera,
   wherein the processor is configured to analyze the image through an image recognition module to detect a customer behavior of at least one customer in the target region,
   the processor is further configured to generate, automatically, customer behavior information according to the customer behavior, wherein the customer behavior information reflects attention of the at least one customer to at least one commodity,
   the processor is further configured to obtain a current position of a specific customer among the at least one customer based on the image, and
   the processor is further configured to control a specific camera among the at least one camera to physically move, by a track mechanism on a shelf, from a first location to a second location on the shelf to capture a commodity image of a commodity to which the specific customer is paying attention.

11. The customer behavior analyzing system as claimed in claim 10, wherein the customer behavior comprises at least one of a movement path of the at least one customer in the target region, a stay position of the at least one customer in the target region, a stay time of the at least one customer at the stay position, a hand movement of the at least one customer, and an eye view angle of the at least one customer.

12. The customer behavior analyzing system as claimed in claim 10, wherein the customer behavior comprises at least one of a behavior that the at least one customer takes a look at the least one commodity, a behavior that the at least one customer picks up the at least one commodity, and a behavior that the at least one customer drops the at least one commodity.

13. The customer behavior analyzing system as claimed in claim 10, wherein the customer behavior information comprises at least one of information of a number of people outside a store, information of a number of people inside the store, information of a number of times of a commodity receiving attention, information of a number of times of a commodity being picked up, information of a number of checkouts, and information of a number of times of return of a customer.

14. The customer behavior analyzing system as claimed in claim 10, wherein the target region comprises an in-store region and an out-of-store region, and the customer behavior information further reflects an entrance ratio of the at least one customer.

15. The customer behavior analyzing system as claimed in claim 10, wherein an operation that the processor analyzes the image through the image recognition module to obtain the customer behavior of the at least one customer in the target region comprises:
   analyzing a first image and a second image to obtain overlapped information of a contour of a target customer in the at least one customer between the first image and the second image; and
   identifying the target customer according to the overlapped information.

16. The customer behavior analyzing system as claimed in claim 10, wherein an operation that the processor analyzes the image through the image recognition module to obtain the customer behavior of the at least one customer in the target region comprises:
   detecting, automatically, a staff in the image through a feature model; and
   ignoring a behavior of the staff in the operation of obtaining the customer behavior of the at least one customer.

17. The customer behavior analyzing system as claimed in claim 10, wherein the at least one camera comprises a first camera, a second camera, and a third camera, the first camera is configured to capture an environment image in the target region, the second camera is configured to capture a customer image in front of a goods shelf in the target region, and the third camera is configured to capture a commodity image of the goods shelf.

18. The customer behavior analyzing system as claimed in claim 17, wherein the processor is further configured to analyze the commodity image through the image recognition module to generate a reminding message which comprises at least one of a message indicating that a quantity of a commodity on the goods shelf is insufficient and a message indicating that a misplaced commodity is present on the goods shelf.

* * * * *